April 11, 1950     W. J. O'BRIEN     2,503,836
RADIO FREQUENCY NAVIGATION SYSTEM
Filed Aug. 27, 1945     4 Sheets-Sheet 1

INVENTOR.
WILLIAM J. O'BRIEN
BY
Attorney

April 11, 1950    W. J. O'BRIEN    2,503,836
RADIO FREQUENCY NAVIGATION SYSTEM
Filed Aug. 27, 1945    4 Sheets-Sheet 4
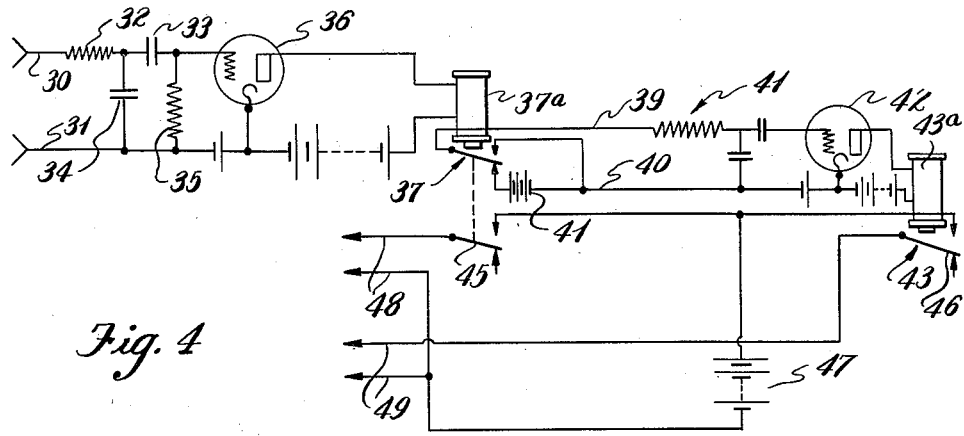
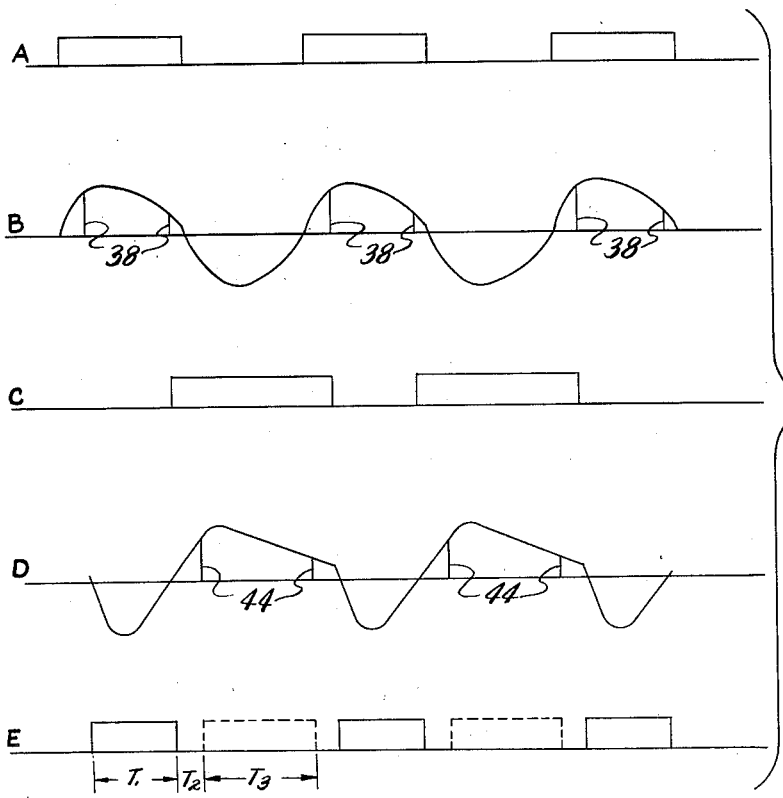
INVENTOR.
BY WILLIAM J. O'BRIEN
Attorney Patented Apr. 11, 1950

2,503,836

UNITED STATES PATENT OFFICE 2,503,836

RADIO-FREQUENCY NAVIGATION SYSTEM

William J. O'Brien, London, England, assignor to The Decca Record Company, Limited, London, England, a corporation of Great Britain Application August 27, 1945, Serial No. 613,001

9 Claims. (Cl. 343—112)

My invention relates to a radio frequency navigational system and has particular reference to an equi-phase displacement type of navigational system which finds particular utility when employed to guide the navigation of vehicles over large areas.

In my copending application Serial No. 612,937, filed August 27, 1945, and entitled navigation system, now abandoned, I have disclosed a radio frequency navigational system of the equi-phase displacement type serving to provide at the location of a vehicle equipped with appropriate receiving apparatus an indication of the geographical location of the vehicle with respect to a coordinate system defined by equi-phase displacement field contours established by the transmission of the radio frequency navigational signals.

In the system above referred to the angular distance of equal phase displacement varies with the azimuth, so that relatively great sensitivity is obtained in two diametrically opposite sectors whereas a much lower sensitivity is afforded in the remaining two sectors. This is particularly true where the three transmitters forming the source of the navigational signals are located on, or nearly on, the same straight line.

It is, therefore, an object of my invention to provide an improved navigational system of the equi-phase displacement type in which substantially equal sensitivity is obtained in each of the four quadrants.

It is also an object of my invention to provide a system of the character set forth in the preceding paragraph in which a dual transmitting system is employed to provide two separate coordinate systems disposed substantially at right angles to each other.

It is an additional object of my invention to provide a system of the character set forth in the preceding paragraphs which includes means at the location of the guided vehicle for giving simultaneous indications of the geographical location of the vehicle with respect to both of the coordinate systems established by the transmitting apparatus.

It is a still further object of my invention to provide an apparatus of the character set forth in the preceding paragraphs in which the apparatus is entirely automatic in its operation, and in which the geographical coordinate indications of the vehicle location are given on separate indicating instruments.

Other objects and advantages of my invention will be apparent from a study of the following specification read in connection with the accompanying drawings, wherein:

Fig. 4 is a schematic wiring diagram illustrating one type of switching control which may be used for controlling the position indicators forming a part of the receiving apparatus; and Fig. 5 is a series of graphs on Cartesian coordinates illustrating the time relationships involved in the operation of the switching equipment shown in Fig. 4.

Figure 1:
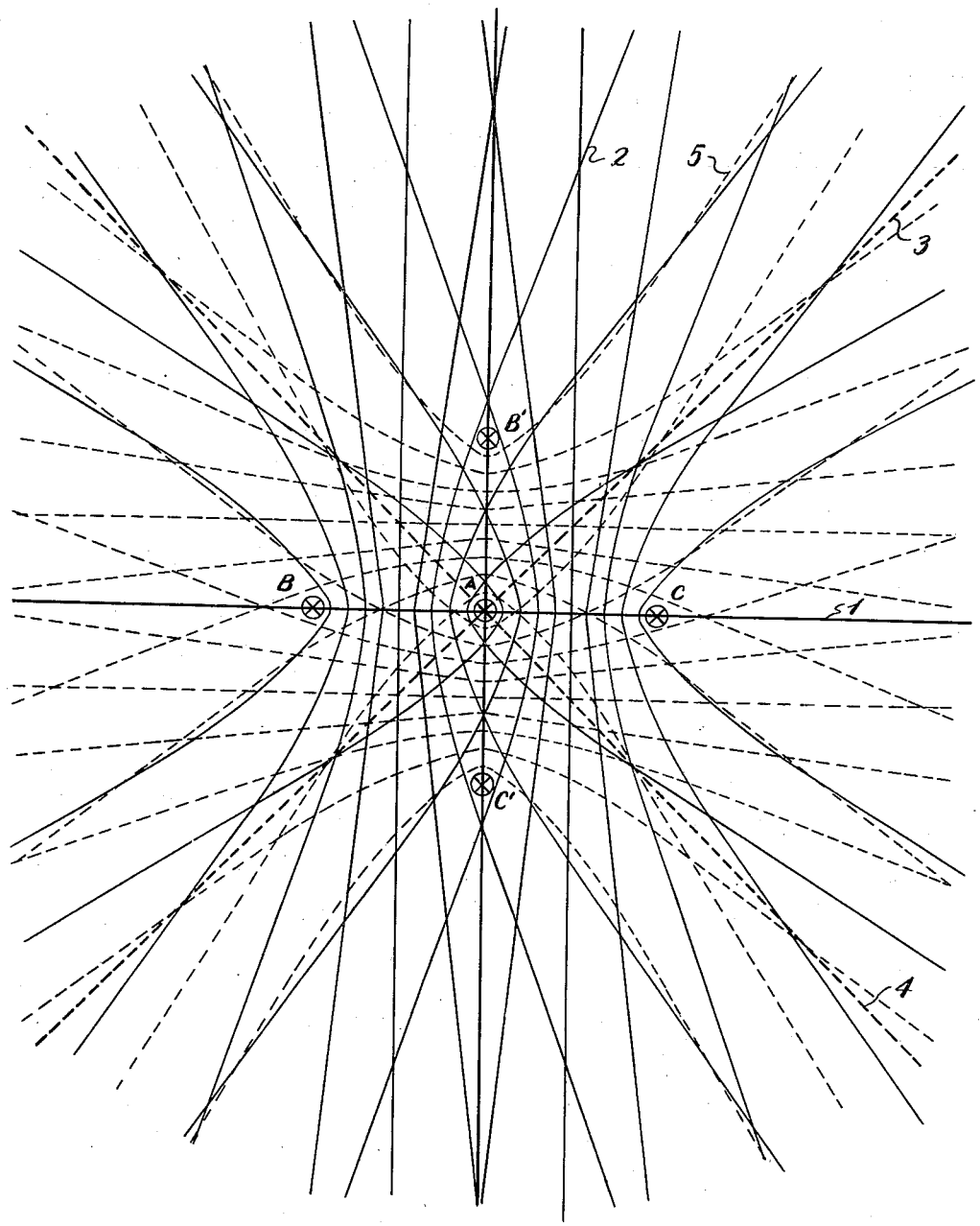
Fig. 1 is a field contour diagram illustrating the nature of the equi-phase displacement field contours produced by the operation of the navigational system of my invention.

Referring to the drawings, I have illustrated a field pattern comprising overlapping and intersecting equi-phase displacement field contours such as are produced by the transmitting apparatus comprising a part of my invention. As is disclosed in Fig. 1 the transmitting apparatus includes five radio frequency transmitters identified by the reference characters A, B, C, B' and C'. The antennae of the transmitters A, B and C are by preference located along the line 1, and are spaced apart as desired depending upon the complexity of the coordinate system desired. When the three transmitters A, B and C are simultaneously operated at different but related frequencies, as, for example 60, 80 and 90 kilocycles respectively and at a fixed multiple phase relation, there results a field pattern of the character illustrated in Fig. 1 by the family of hyperbolae such as are shown by the solid lines 2 in Fig. 1. It will be noted that in Fig. 1 relatively great sensitivity of indication will be given in the upper and lower quarter circle sectors defined by the heavy dashed lines 3 and 4, and that the sensitivity is relatively poor in the two side sectors. When transmitters B' and C' are operated at frequencies of 80 and 90 kilocycles respectively with the transmitters B and C inoperative there results a field pattern of the character shown in Fig. 1 by the family of hyperbolae consisting of the dotted lines 5. It will be noted that with respect to this field pattern the sensitivity is relatively great in the right and left quarter circle sectors and relatively poor in the upper and lower sectors.

Figure 2:
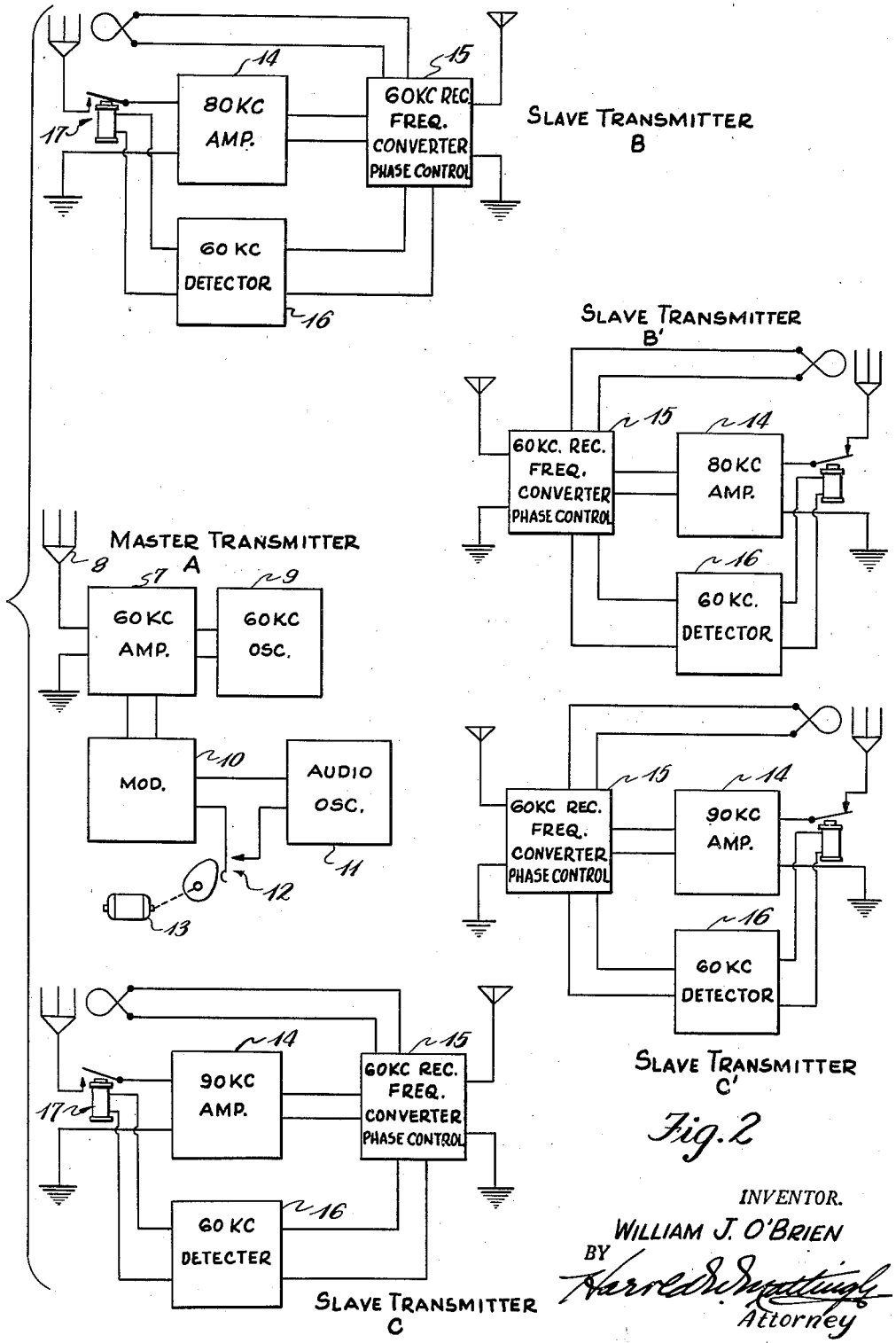
Fig. 2 is a block diagram illustrating the equipment comprising the transmitting portion of the system and indicating its mode of operation.

The apparatus of the present invention provides for operating transmitter A continuously and alternately operating transmitters B, C and B', C'. The transmitter equipment is of the general type disclosed in my aforementioned copending application and may be arranged as illustrated in Fig. 2. The master transmitter A may comprise a 60 kilocycle power amplifier 7 adapted to drive the A antenna represented by the reference character 8 in Fig. 2 and be driven by a suitable 60 kilocycle oscillator represented at 9. The master transmitter equipment includes also a modulator 10 arranged to be driven by an audio frequency oscillator 11 to modulate at a suitably low frequency the radio frequency signals radiated from antenna 8.

Between the oscillator 11 and the modulator 10 I interpose a cam operated switch 12 adapted to be driven at substantially constant rate as by means of a motor 13. The cam switch 12 and motor 13 are arranged to connect the oscillator 11 and the modulator 10 intermittently to provide spaced periods during which the signals from antenna 8 are modulated interspaced with periods of equal length during which an unmodulated continuous wave is radiated by antenna 8. While great latitude is permissible in the choice of the the switching rate a preference is expressed for a periodicity of about three seconds; that is, a transmission of about 1½ seconds duration during which the A signal is modulated followed by a period of equal length during which the A signal consists of an unmodulated continuous wave.

Slave transmitters B and C are substantially identical and comprise power amplifiers 14 arranged to supply 80 and 90 kilocycle radio frequency power to the B and C antennae, and be excited at the proper frequency by drive units 15 which are preferably constructed along the lines disclosed in my aforementioned copending application. These drive units comprise 60 kilocycle receivers for receiving signals transmitted from the A location, together with frequency conversion equipment for providing the 80 or 90 kilocycle signal required to excite the amplifiers 14, and including also suitable phase control equipment for maintaining a fixed multiple phase relation between the signals radiated from the A, B and C antennae.

In addition to the foregoing there are provided 60 kilocycle detector circuits 16 arranged to demodulate the modulated transmissions from antenna A. The output of the detector is applied to the coil of a relay 17, normally open contacts of which are included in the antenna circuits of the B and C transmitters. In normal operation the relays 17 will be energised during the periods in which the A signals are modulated to thereby complete the circuits between the power amplifiers and the B and C antennae so that 80 and 90 kilocycle signals are transmitted from the B and C antennae during the periods in which the 60 kilocycle transmissions from antenna A are modulated.

The equipment comprising the slave transmitters B' and C' is identical to that described in connection with slave transmitters B and C except that the relay contacts included in the antenna circuits are of the normally closed type arranged to be opened by energisation of the relay coil. Thus, the 80 and 90 kilocycle signals will be transmitted from stations B' and C' during the time the A signal is unmodulated and, therefore, alternately with the transmissions from antenna B and C.

Figure 3:
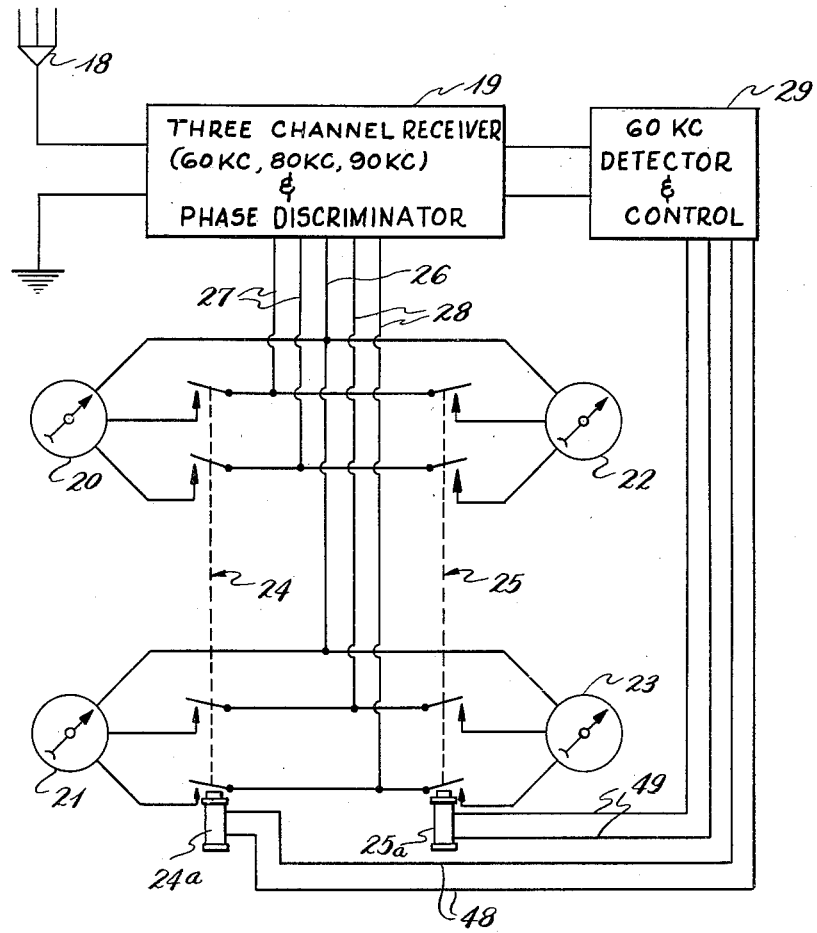
Fig. 3 is a block diagram illustrating a suitable type of mobile receiver to be used with the transmitting apparatus shown in Fig. 2 and intended to be mounted within a mobile vehicle to be guided by the navigational system.

I have illustrated in Fig. 3 receiving apparatus which may be used to take advantage of the dual coordinate system established by the operation of the transmitting equipment. The receiving equipment includes a receiving antenna 18 coupled to a three channel receiver 19 for simultaneously receiving the 60, 80 and 90 kilocycle signals from the five transmitting antennae. This receiving apparatus is preferably constructed along the lines disclosed in my copending application Serial No. 612,991, filed August 27, 1945 and entitled Multiple channel radio frequency receiver, now Patent No. 2,500,200, issued March 14, 1950, and includes phase discriminating apparatus for determining the multiple phase relations existing among the received A, B and C signals. The phase discriminator is connected as shown in Fig. 3 to two sets of phase angle indicators comprising registering goniometers 20, 21 and 22, 23. The indicators 20–23 are preferably of the type disclosed in my copending application Serial No. 612,984, filed August 27, 1945, and entitled "Registering goniometer," now Patent No. 2,499,326, issued February 28, 1950. The indicators 20 and 21 are arranged to indicate the coordinate location of the vehicle in terms of the solid lined coordinate system shown in Fig. 1, and established by the operation of the A, B and C transmitters, whereas the indicators 22 and 23 are arranged to indicate the location of the vehicle in terms of the dotted line coordinate system shown in Fig. 1 and produced by the operation of the A, B' and C' transmitters.

The common output lead 26 from the receiver and phase discriminator 19 is connected to each of the four indicators 20–23. One pair of output leads 27 associated with one set of coordinate lines is connected respectively to two normally open contacts of the relay 24 and two normally open contacts of a relay 25. In a similar way the pair of output leads 28 associated with the other coordinate of the coordinate system is connected to another pair of normally open contacts of the relay 25 and also to another pair of normally open contacts of the relay 24. The relay contacts and the circuits therefor are so arranged that when the relay 24 is energised to close its associated contacts the indicators 20 and 21 will be connected in operative relationship to the receiver and phase discriminator 19, whereas the energisation of relay 25 will establish an operative connection between the receiver and phase discriminator 19 and the indicators 22 and 23.

The coils of the relays 24 and 25 are connected as shown to a 60 kilocycle detector and relay control circuit represented by the rectangle bearing the reference character 29. The detector included may be of conventional type and connected into the 60 kilocycle channel so as to produce a square wave output such as is indicated in graph A of Fig. 5. This square wave signal is fed into control equipment to be described hereinafter which operates to energise relay 24 during the periods of modulated transmission from antenna A, and to energise relay 25 during the unmodulated periods of transmission from antenna A. Furthermore, the equipment operates to interpose a time delay between each of the relay operations so that each set of goniometers is connected to the phase discriminating equipment after the receiving and phase discriminator equipment has had time to stabilise following the switch over in the transmitting equipment.

The output of the detector is fed as by means of conductors 30 and 31 (Fig. 4) to a resistance capacity network comprising a series connected resistance and condenser 32 and 33 with a condenser 34 and a resistance 35 connected in shunt relation. The output of the network is applied to a vacuum tube 36 and the network operates to apply to the grid of the vacuum tube 36 a voltage of the character represented by the curved line of graph B in Fig. 5. The plate circuit for the vacuum tube 36 includes a coil 37a of a relay indicated generally at 37. The curved line of graph B (Fig. 5) is also representative of the plate current of the tube 36 and, therefore, represents the current passed through the relay coil 37a.

The short vertical lines 38 in Fig. 5 represent the pick-up and drop-out currents of the relay coil 37a. By comparing curves A and B it may be seen that the contacts of relay 37a will close a short time after the beginning of a square wave impulse and will open a short time before the impulse ceases. Contacts of the relay 37 are connected in a circuit including conductors 39 and 40 and a battery 41 so arranged as to apply a direct potential between conductors 39 and 40 during the time the relay is not actuated, and to interconnect directly conductors 39 and 40 during the time the relay 37 is actuated. By this means there is applied across conductors 39 and 40 a square wave signal of the character represented by graph C of Fig. 5.

Conductors 39 and 40 feed a resistance capacity network indicated generally at 41 and substantially identical to that described as comprising the input circuit to the vacuum tube 36. The network 41 comprises the input circuit for a second vacuum tube 42. Therefore, the signal voltage applied to the grid of the vacuum tube 42 has a wave form of the character indicated by the curved line in graph D of Fig. 5. The plate circuit for the vacuum tube 42 includes a coil 43a of a relay represented generally at 43. Since the plate current changes of the vacuum tube 42 are like the grid voltage changes the curved line of graph D of Fig. 5 may represent also the current flowing through the coil of the relay 43.

The short vertical lines 44 shown in Fig. 5 represent the pick-up and drop-out current values respectively of the coil 43a. By comparing curves B and D as has been done in graph E of Fig. 5 it will be seen that relay 37 is operated for a short period T1 and that after a short delay T2 following the return of the relay 37 to its normal position the relay 43 is energised for a short time T3. The sum of the times T1, T2, T3 and T2 is the time consumed by one complete cycle of the audio frequency modulation applied to antenna A.

Relays 37 and 43 include normally open contacts 45 and 46 connected in circuit with a battery 47 or other suitable source of power, and arranged when energised to impress the battery voltage across pairs of conductors 48 and 49 respectively. These pairs are connected as shown in Fig. 3 to the relay coils 24a and 25a.

In operation the transmitting equipment is energised and the motor 13 is placed in operation. When this is done transmitter A operates continuously but sends out alternately an audio frequency modulated signal and a continuous wave unmodulated signal. During this time transmitters B, C, B' and C' are all operative but the antenna circuits are connected alternately so that during the periods of transmission of a modulated signal from transmitter A the antennae for transmitters B and C will be connected to the output amplifiers, whereas during the periods of unmodulated transmission from antenna A the antennae for transmitters B and C will be disconnected and the antennae for transmitters B' and C' will be connected to their respective power amplifiers. The same audio frequency modulation which cycles the transmitter operation also operates the switching relays 24 and 25 in the receiving equipment so as to cause the phase indicators 20 and 21 to develop an indicating torque during the time the navigational signals are being transmitted from antennae A, B and C, and to alternately cause the indicators 22 and 23 to develop indicating torque during the period of operation of transmitters A, B' and C'.

The goniometers do not include any mechanism for producing a restoring torque and therefore hold the previous indication during the time they are disconnected from the phase discriminating equipment. Since the operating cycle is relatively short (preferably three seconds), it will be seen that each pair of phase indicators provides a substantially continuous indication of the geographical location of the vessel in terms of the two coordinate systems with which the indicators are respectively associated.

Attention is directed to the fact that by this means highly sensitive and very accurate geographical location indications can be afforded a vehicle regardless of his azimuthal position with relation to the transmitting equipment.

While I have shown and described the preferred embodiment of my invention I do not desire to be limited to the details of construction which have been shown and described herein except as defined in the appended claims.

I claim:

1. In a radio frequency navigational system, the combination of: one pair of radio frequency transmitting antennae spaced from each other; a central transmitting antenna located on line joining said one pair; another pair of radio frequency transmitting antennae disposed on opposite sides of said central antenna in a position extending a line joining said other pair of antennae substantially at right angles to the line joining said one pair of antennae and through said central antenna; means for radiating from said central antenna radio frequency signals of a given frequency; means for radiating respectively from the antennae of said one pair radio frequency signals of a second and third frequency each related to said given frequency and each bearing a fixed multiple phase relation thereto; means for radiating from said other pair of antenna radio frequency signals of said second and third frequencies and bearing said fixed multiple phase relation to said signals of given frequency; and means for alternately rendering operative and inoperative the antennae of said one pair and said other pair.

2. In a radio frequency navigational system, the combination of: one pair of radio frequency transmitting antennae spaced from each other; a central transmitting antenna located on line joining said one pair; another pair of radio frequency transmitting antennae disposed on opposite sides of said central antennae in a position extending a line joining said other pair of antennae substantially at right angles to the line joining said one pair of antennae and through said central antenna; means for radiating from said central antenna radio frequency signals of a given frequency; means for radiating respectively from the antennae of said one pair radio frequency signals of a second and third frequency each related to said given frequency and each bearing a fixed multiple phase relation thereto; means for radiating from said other pair of antennae radio frequency signals of said second and third frequencies and bearing said fixed multiple phase relation to said signals of given frequency; means for alternately rendering operative and inoperative the antennae of said one pair and said other pair; a mobile three channel receiver for simultaneously receiving the three radio frequencies transmitted from said antennae; and phase angle indicating means connected to said receiver for continuously indicating the multiple phase relationships at the location of said receiver among the signals radiated from said central antenna and said one pair of antennae and among the signals radiated from said central antenna and said other pair of antennae.

3. In a radio frequency navigational system, the combination of: one pair of radio frequency transmitting antennae spaced from each other; a central transmitting antenna located on line joining said one pair; another pair of radio frequency transmitting antennae disposed on opposite sides of said central antenna in a position extending a line joining said other pair of antennae substantially at right angles to the line joining said one pair of antennae and through said central antenna; means for radiating from said central antenna radio frequency signals of a given frequency; means for radiating respectively from the antennae of said one pair radio frequency signals of a second and third frequency each related to said given frequency and each bearing a fixed multiple phase relation thereto; means for radiating from said other pair of antennae radio frequency signals of said second and third frequencies and bearing said fixed multiple phase relation to said signals of given frequency; means for alternately rendering operative and inoperative the antennae of said one pair of said other pair; a mobile three channel receiver for simultaneously receiving radio frequency signals of the three frequencies transmitted by said antennae; phase angle measuring apparatus connected to said receiver for measuring the multiple phase relationships at said receiver among the signals radiated from said central antenna and said one pair of antennae and among the signals radiated from said central antenna and said other pair of antennae; two pair of phase angle indicating devices for indicating the phase relationships determined by said phase angle measuring apparatus; and switching means for alternately connecting said pairs of phase angle indicating devices to said phase angle measuring apparatus in synchronism with the alternations of the transmissions from said one pair of antennae and said other pair of antennae.

4. In a radio frequency navigational system, the combination of: one pair of radio frequency transmitting antennae spaced from each other; a central transmitting antenna located on line joining said one pair; another pair of radio frequency transmitting antennae disposed on opposite sides of said central antenna in a position extending a line joining said other pair of antennae substantially at right angles to the line joining said one pair of antennae and through said central antenna; means for radiating from said central antenna radio frequency signals of a given frequency; means for radiating respectively from the antennae of said one pair two radio frequency signals of a second and third frequency each related to said given frequency and bearing a fixed multiple phase relation thereto; means for radiating from said other pair of antennae radio frequency signals of said second and third frequencies and bearing said fixed multiple phase relation to said given frequency; means for periodically modulating at a low frequency the radio frequency signals transmitted from said central antenna; switching apparatus at each of the antennae of said one pair and said other pair operable to alternately permit and prevent radiation from the associated antennae; and means at each of the antennae of said one and other pairs for receiving radio frequency signals from said central antenna and including means for operating said switching means in response to the reception of low frequency signals from said central antenna, said switching means being so arranged as to permit radiation from the antennae of said one pair when a low frequency modulated signal is transmitted from said central antenna and for permitting radiation from the antennae of said other pair when no low frequency modulation is applied to the signal radiated from said central antenna.

5. In a radio frequency navigational system, the combination of: one pair of radio frequency transmitting antennae spaced from each other; a central transmitting antenna located on line joining said one pair; another pair of radio frequency transmitting antennae disposed on opposite sides of said central antenna in a position extending a line joining said other pair of antennae substantially at right angles to the line joining said one pair of antennae and through said central antenna; means for radiating from said central antenna radio frequency signals of a given frequency; means for radiating respectively from the antennae of said one pair radio frequency signals of a second and third frequency each related to said given frequency and bearing a fixed multiple phase relation thereto; means for radiating from said other pair of antennae radio frequency signals of said second and third frequencies and bearing said fixed multiple phase relation to said given frequency; means for periodically modulating at a low frequency the radio frequency signals transmitted from said central antenna; switching apparatus at each of the antennae of said one pair and said other pair operable to alternately permit and prevent radiation from the associated antennae; means at each of the antennae of said one and other pairs for receiving radio frequency signals from said central antenna and including means for operating said switching means in response to the reception of audible frequency signals from said central antenna, said switching means being so arranged as to permit radiation from the antennae of said one pair when a low frequency modulated signal is transmitted from said central antenna and for permitting radiation from the antennae of said other pair when no low frequency modulation is applied to the signal radiated from said central antenna; a mobile three channel receiver for simultaneously receiving the radio frequency signals transmitted from said antennae; phase angle measuring apparatus coupled to said receiver for measuring the multiple phase relationships existing at the location of said receiver among the three simultaneous transmissions from said antennae; two pair of phase angle indicators; switching means for alternately connecting each of said pairs of indicators to said phase angle measuring apparatus; and means associated with said mobile receiver and responsive to low frequency modulation of the signals received by said receiver for operating said switching means in synchronism with the periodicity of the transmission of radio frequencies from said one pair of antennae and from said other pair of antennae.

6. In a radio frequency navigation system, the combination of: transmitting means for producing a first radio frequency equi-phase displacement field pattern; another transmitting means for producing a second radio frequency equi-phase displacement field pattern; means for operating said transmitters alternately; a radio frequency receiver for receiving signals from said transmitters and including a first phase indicator associated with said first radio frequency field pattern and a second phase indicator associated with said second radio frequency field pattern for indicating the respective phase relations at the location of said receiver; and means to alternately provide torque to said indicators only during time intervals synchronised with said alternate operation of said transmitters.

7. The method of guiding the navigation of a mobile vehicle which consists in radiating omnidirectional radio frequency signals alternately from two different groups of spaced points, each of said groups comprising two pair of spaced points, to thereby alternately establish two corresponding differently oriented sets of radio frequency equi-phase displacement field patterns, each of said sets comprising two overlapping and intersecting patterns of radio frequency equi-phase displacement field contours, and alternately in synchronism with the alternate establishment of said two sets of field patterns determining and indicating the location of said vehicle with respect to each of said sets of patterns.

8. In a radio frequency navigational system, the combination of: transmitting means operable to radiate a plurality of omnidirectional radio frequency signals and thereby establish one set of intersecting equi-phase displacement field patterns; another transmitting means operable also to radiate a plurality of omnidirectional radio frequency signals and thereby establish another and differential oriented set of intersecting equi-phase displacement field patterns, each of said sets of field patterns comprising two overlapping and intersecting patterns of radio frequency equi-phase displacement field contours; and means for alternating operating said transmitting means.

9. In a radio frequency navigation system, the combination of: transmitting means for producing a first radio frequency equi-phase displacement field pattern; another transmitting means for producing a second radio frequency equi-phase displacement field pattern; means for operating said transmitting means alternately; a radio frequency receiver for receiving signals from said transmitting means and including a first phase indicator associated with said first radio frequency field pattern and a second phase indicator associated with said second radio frequency field pattern for indicating the respective phase relations at the location of said receiver, said phase indicators each including an indicating element movable only by torque provided by signals received by said radio frequency receiver; and means to alternately provide torque to said indicators only during time intervals synchronized with said alternate operation of said transmitting means, whereby said indicating elements remain stationary and hold their indications between said time intervals.

WILLIAM J. O'BRIEN.

REFERENCES CITED

The following references are of record in the file of this patent:

UNITED STATES PATENTS

| Number | Name | Date |
| --- | --- | --- |
| 2,144,203 | Shanklin | Jan. 17, 1933 |
| 2,148,267 | Honore | Feb. 21, 1939 |
| 2,165,256 | Hansell | July 11, 1939 |
| 2,379,362 | Lear | June 26, 1945 |
| 2,408,773 | Goodall | Oct. 8, 1946 |
| 2,433,381 | Marchand | Dec. 30, 1947 |